United States Patent [19]
Flemmer et al.

[11] Patent Number: 5,372,458
[45] Date of Patent: Dec. 13, 1994

[54] SYSTEM FOR TREATING DRILLING MUD CONTAINING POTASSIUM CHLORIDE (KCl) FOR DISPOSAL

[76] Inventors: Henry Flemmer, 10635 - 47 Avenue, Edmonton, Alberta, Canada, T6H 4R8; Arne E. Hansen, 5029 - 43A Street, Barrhead, Alberta, Canada, T7N 1J5

[21] Appl. No.: 92,010

[22] Filed: Jul. 15, 1993

[51] Int. Cl.$^5$ .......................... F26B 3/24; F26B 11/02
[52] U.S. Cl. ...................................... 405/128; 34/135; 34/166; 110/246; 110/346; 432/111
[58] Field of Search ............... 110/236, 246, 245, 346; 34/135, 136, 166; 432/111, 118; 405/128, 129, 258

[56] References Cited

U.S. PATENT DOCUMENTS

| | | |
|---|---|---|
| 2,478,757 | 8/1949 | Foster . |
| 3,313,869 | 4/1967 | Cohen . |
| 3,705,711 | 12/1972 | Seelandt et al. ................ 432/111 X |
| 4,092,098 | 5/1978 | Honaker et al. ................ 110/246 X |
| 4,427,376 | 1/1984 | Etnyre et al. ................... 432/111 X |
| 4,921,538 | 5/1990 | Lafser, Jr. et al. . |
| 4,955,722 | 9/1990 | Marconney ..................... 432/111 X |
| 5,067,254 | 11/1991 | Linkletter et al. ................ 34/135 X |
| 5,203,693 | 4/1993 | Swanson ........................ 34/136 X |
| 5,257,587 | 11/1993 | Ohlsen et al. ........................ 110/346 |
| 5,273,355 | 12/1993 | May et al. ..................... 110/236 X |

Primary Examiner—Dennis L. Taylor
Assistant Examiner—John A. Ricci
Attorney, Agent, or Firm—Sheridan Ross & McIntosh

[57] ABSTRACT

A method is provided for treating used potassium chloride (KCl) drilling mud for disposal. The process comprises feeding the mud into one end of a rotary tube, advancing the mud through the rotating tube and heating the mud by cascading action using lifters, to expose it to a hot gas stream, thereby partially drying the mud to lumps, further modifying the lumps by contacting them with a burner flame to form clinker pellets, and finally contacting the clinker pellets with a second flame to complete the drying process, producing dried clinker pellets containing the majority of the KCl in the mud, the pellets having a structure that resists the leaching action of water. The pellets further lend themselves to being evenly distributed over fields, so that unwanted excessive concentrations of KCl can be avoided.

4 Claims, 2 Drawing Sheets

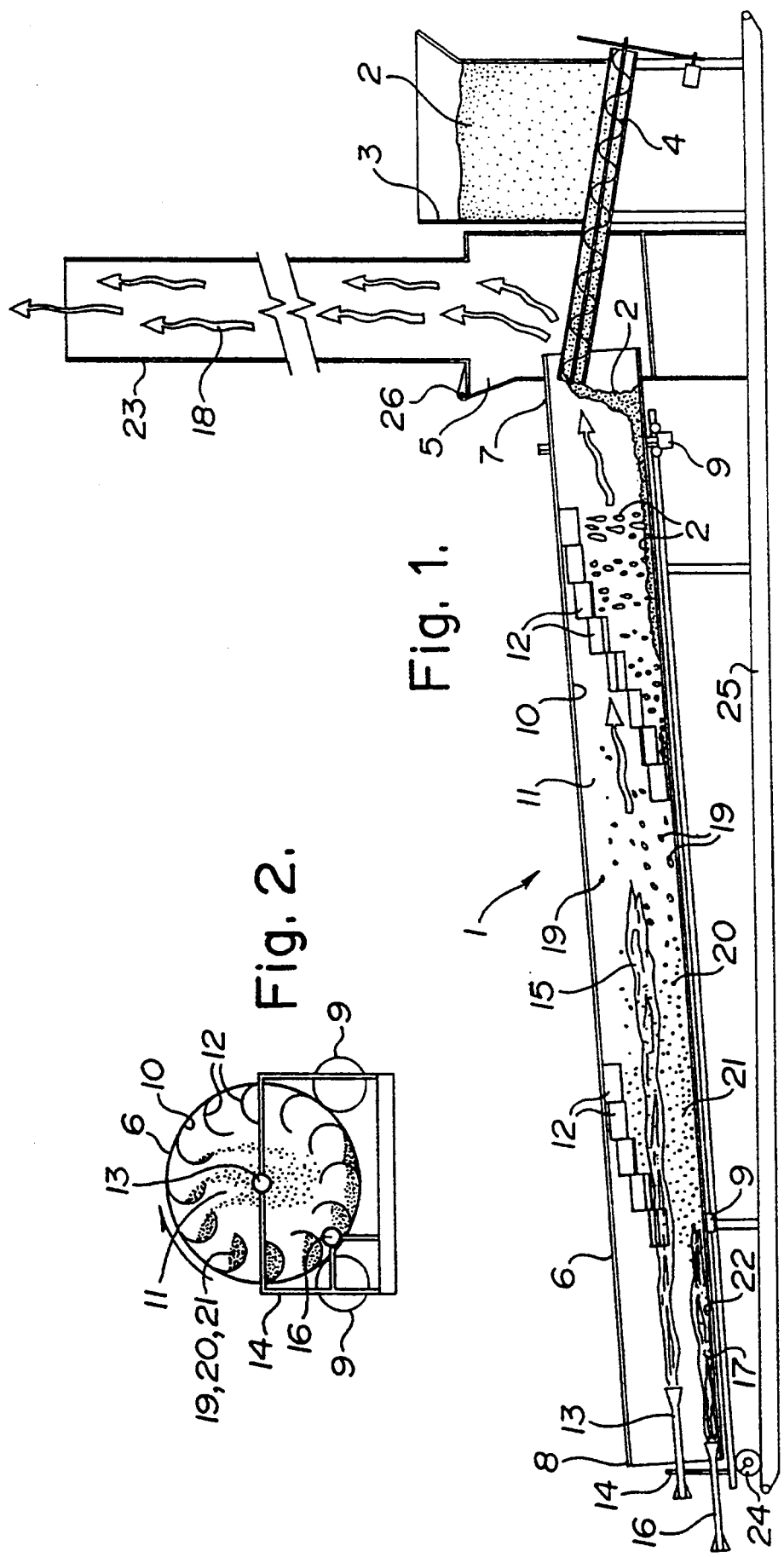

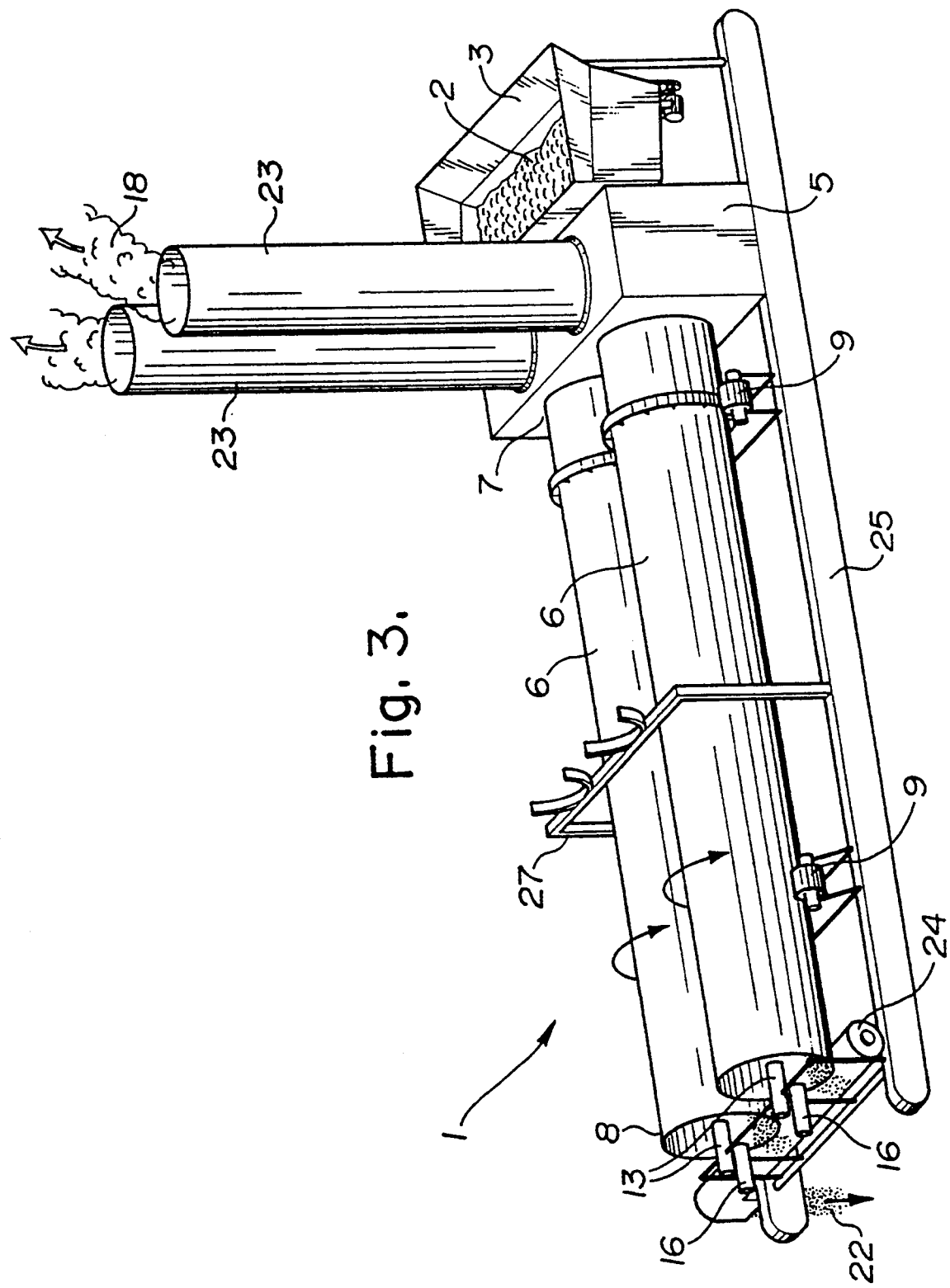

SYSTEM FOR TREATING DRILLING MUD CONTAINING POTASSIUM CHLORIDE (KCl) FOR DISPOSAL

FIELD OF THE INVENTION

The process relates to an open-fired, rotating kiln operation for drying an aqueous slurry containing salt and clay to produce dried clinker pellets containing most of the salt, the pellets being resistive to water leaching and amenable for distribution over land for disposal.

BACKGROUND OF THE INVENTION

Drilling fluids or mud are commonly used in the oil and gas drilling industry. Mud is used to maintain borehole pressure equilibrium and to remove bit cuttings. Mud is typically a highly lubricating slurry of clays and fluid. One such mud, containing potassium chloride, is referred to as KCl mud. This process has been developed in connection with treatment of KCl mud, although it is not limited to it. After drilling a well, significant quantities of spent mud remain. Typically, a used KCl mud may contain 40,000 ppm of salt in an aqueous bentonite clay slurry.

In the past, the used mud has been mixed with soils or otherwise spread on fields for disposal. The increase in regulations for disposal of noxious materials and the level of salts in this particular type of used drilling mud has made disposal difficult and expensive.

Prior methods of disposal include diluting the mud with water, to reduce the fractional KCl levels to acceptable disposal limits (ie. 5,000 ppm KCl), and then spraying it on fields. This has been a very expensive process. Additionally, the highly diluted mud is also mobile and amenable to leaching and transport of salts by rain water. This leads to accumulation and high concentration of salts in low areas of the field, thus ultimately failing the disposal criteria.

SUMMARY OF THE INVENTION

The present invention relates to a method for treating an aqueous slurry of used drilling mud containing salt and clay by evaporating contained water to form lumps and converting the lumps by contact with open flame into fully dried, cohesive pellets retaining most of the original salt. The pellets are adapted to only slowly release the salt to water, such as rain water. In the pellet form, the slurry residue can be uniformly distributed with a mechanical spreader on fields and will give up its salt at such a slow rate that concentrations in low spots will not reach prohibited levels.

The invention utilizes an open-fired rotating kiln, comprising:
 a rotatable tube having feed and product ends;
 a central burner positioned in the product end and adapted to project an open flame along the axis of the tube (typically, the tube will have a length of 30 feet and diameter of 30 inches and the burner will project a flame extending about 15 feet up the tube bore); preferably, a wall burner which is also positioned in the product end and is adapted to project an open flame along the surface of the lower portion of the tube wall;
 internal lifters mounted to the inner surface of the tube wall, for cascading the feed moving through the tube bore; and
 means for feeding slurry into the tube bore at its feed end and
 means for removing product pellets from the product end.

In operation, slurry is fed into the bore of the rotating tube at its feed end. As it advances through the first section of the bore (termed the "evaporation zone"), the slurry is lifted, cascaded and heated as it moves counter-currently to the hot exhaust gases produced by the burners. In the course of this action, most of the water contained in the liquid sheets of cascading slurry is vaporized and exits to atmosphere as steam, through stacks located at the feed end of the tube. At the time of meeting the inner end of the center burner flame, the evaporation residue has been converted into substantially dried lumps. While passing through the second section of the bore (termed the "pelletizing zone"), where it is in contact with one or both of the burner flames, the residue is further heated and again converted, this time into the form of dried, pebble-like pellets. Typically, the pellets have a dimension in the order of 3/8 inch.

It has been found that:
 the water must be removed as a first step, so that high temperatures can be achieved in the pelletizing zone—otherwise the continuing vaporization of the water would unduly limit the temperatures reached;
 contact with one or more open hot flames over a suitable residence time is needed to create the pellets;
 the clay in the mud residue appears to undergo a bonding or sintering effect under the high temperatures involved and this creates the desirable cohesiveness that characterizes the product pellets; and
 the salt is retained in the product pellets and water can only slowly leach it from the pellets—the pellets can retain their structural stability for up to 30 days in a jar of water.

In tests, the dried pellets have successfully been mechanically distributed in a uniform manner over fields in accordance with the concentrations allowed under Alberta regulations.

BRIEF DESCRIPTION OF THE DRAWINGS

FIG. 1 is a schematic cross sectional view of apparatus for implementing the method of the invention;

FIG. 2 is a burner end view of the rotary tube, lifters and burner arrangement according to FIG. 1; and FIG. 3 is a perspective view of a twinned installation of the apparatus according to FIG. 1.

DETAILED DESCRIPTION OF THE PREFERRED EMBODIMENT

It is contemplated that the method of the invention can be applied generally to aqueous slurries of used drilling mud containing salts and clay. However it will be described herein in connection with used KCl drilling mud slurry.

As depicted in FIG. 1, an apparatus 1 is provided for implementing a method of treating the used KCl drilling mud and producing dried pellets for distribution on fields.

KCl drilling mud slurry 2, containing salt and bentonite clay, is fed to a hopper 3. (This feed is hereafter referred to as "mud".) At the base of the hopper is an opening to a feed screw conveyor 4, which transports the mud through a stationary exhaust gas cowling 5 into an elongated rotary tube 6 having a feed end 7 and a product end 8.

The rotary tube 6 is a 30 inch diameter cylinder, about 30 feet long, supported on at least four peripheral rollers 9 and having a drive means (not shown) for rotating the tube. As viewed in FIG. 2, the tube has an inner surface 10 and a bore 11 16 within which are mounted a plurality of lifters 12. The lifters 12 project radially inwards, along most of the tube's length. In FIG. 2, the tube rotation is clockwise. The equiangularly spaced lifters 12 are arranged in a helical pattern from near the feed end 7 to within 6 feet of the pellet end 8. Each lifter 12 is semi-circular in section and about 6 inches in diameter.

A first burner 13 is mounted on a stationary frame 14 located at the pellet end 7 and oriented at the tube's longitudinal axis. The burner 13 is adapted to project a first flame 15 aligned with the bore axis of the tube 6. A second burner 16 is similarly mounted to the stationary frame 14, oriented parallel to and offset from the tube's longitudinal axis. This second burner 16 is adapted to project a second flame 17 adjacent the lower portion of the tube's inner surface 10. Propane fuel has been used but other fuels may be used dependent upon economics and availability. The burners 13, 16 produce a hot exhaust gas 18 which flows through the bore 11 of the tube 6, from its pellet end 8 to its feed end 7.

The rotary tube 6 is inclined at about 4 degrees which, in combination with the rotary action of the tube, induces an advancement of the mud 2 down the bore 11 of the tube towards the product end 8.

The lifters 12 act to lift and cascade the mud 2 through the hot exhaust gases 18 travelling through the bore 11, directly heating the mud 2 and vaporizing contained water. The mud 2 dries somewhat and starts to form lumps 19. The lifters 12 closer to the product end 8 act to bring the lumps 19 of mud into contact with the first flame 15, which further dries the lumps 19 and causes them to break down and begin to form partly dried pellets 20. The partly dried pellets 20 then exit the lifter-equipped section of the tube 6 and are directly contacted by the second flame 17 which completes the conversion of the lumps 19 to product pellets 22. The product pellets 22 are found to retain most of the KCl salt originally present in the mud 2.

Contact of the partly dried pellets with the open flame 15 initiates a conversion of the partially dried pellets 20 into fully dried, cohesive, hard, small, pebble-like product pellets 21. It is believed that the high temperatures experienced by the pellets 20 upon contacting the open flames 15, 17 causes the clay particles to undergo a sintering effect that is demonstrated by the fact that the product pellets 22 are substantially more cohesive and resistant to water breakdown than the lumps 19 or partly dried pellets 20. The product pellets 22 are amenable to being handled in and cast by equipment such as a truck box and agricultural fertilizer spreader, to yield substantially uniform distribution of the product pellets on a ground surface and to meet government-imposed salt spread ratio limitations.

The countercurrent flow of the mud 2 and gas stream 18 results in a cooling of the burner gases from typically 3000° F. at the flame to an exhaust gas temperature which is preferably in the range of 250 to 350° F. The gas stream 18 is captured in the exhaust gas cowling 5, which minimally seals against the rotary tube 6, and is conveyed away with a vertical exhaust stack 23 mounted thereabove.

The fully dried product pellets 22 discharge from the tube 6, preferably into a product screw conveyor 24, whereby they may be transported away from the tube 6 for subsequent cooling and temporary storage.

The cooled product pellets 22 may be transferred from storage to a distributor means such as an agricultural spreader for measured discharge to fields in accordance with regulatory maximum concentration requirements. The pellets, having been treated to be resistant to the leaching action of water, are then resistive to releasing sufficient KCl during normal environment action (rainfall) to pose an accumulation or concentration hazard.

As viewed in FIG. 3, in the preferred embodiment, two identical trains of feed screw conveyors 4, exhaust gas stacks 23, burners 13,16 and rotary tubes 6 are employed, feeding from a common hopper 3 and discharging to a common transverse product screw conveyor 24. Both trains are mounted side by side on a common shipping skid 25 for ease of transport from site to site. The exhaust stacks may be rotated from a vertical operating position, on a pivot point 26, to permit lowering to a shipping cradle 27.

The embodiments of the invention in which an exclusive property or privilege is claimed are defined as follows:

1. A method for treating an aqueous slurry of used drilling mud containing salt and clay in a rotating tube forming a bore having first and second ends, comprising:

projecting at least one open flame part way down the bore from its second end and producing therefrom a flow of hot combustion gas that moves through the bore and is exhausted from the bore adjacent its first end;

introducing the slurry into the bore at its first end;

advancing the slurry through the bore until it reaches flame while simultaneously cascading it during such advance, so that the slurry moves countercurrently to the flow of hot combustion gas, is directly heated thereby and water is evaporated from the slurry to leave a mud residue in the form of discrete lumps which retain therein most of the salt;

further advancing the mud residue lumps while contacting them with the flame to convert said lumps into dried pellets that retain the salt and are more cohesive and resistant to water breakdown than the lumps; and discharging the pellets from the second end of the bore.

2. The method as set forth in claim 1 wherein the slurry is used KCl drilling mud.

3. A method for treating an aqueous slurry of used drilling mud containing salt and clay in a rotating tube having an inside surface forming a bore having first and second ends, comprising:

projecting two open flames part way down the bore from its second end, one flame being positioned centrally of the bore and the other being positioned adjacent the lower portion of the inside surface of the tube, and producing therefrom a flow of hot combustion gas that moves through the bore and is exhausted from the bore adjacent its first end;

introducing the slurry into the bore at its first end:

advancing the slurry through the bore until it reaches flame while simultaneously cascading it during such advance, so that the slurry moves countercurrently to the flow of hot combustion gas, is directly heated thereby and water is evaporated from the slurry to leave a mud residue in the form of discrete lumps which retain therein most of the salt;

further advancing the mud residue lumps while contacting them with flame to convert the lumps into dried pellets that retain the salt and are more cohesive and resistant to water breakdown than the lumps; and discharging the pellets from the second end of the bore.

4. The method as claimed in claim 3, wherein the slurry is used KCl drilling mud.

* * * * *